United States Patent [19]
Kaduk et al.

[11] 3,875,455
[45] Apr. 1, 1975

[54] UNDERCOAT FOR PHOSPHOR IN REPROGRAPHIC LAMPS HAVING TITANIUM DIOXIDE REFLECTORS

[75] Inventors: Edward E. Kaduk, Lyndhurst; Ronald J. Olwert, Willoughby, both of Ohio

[73] Assignee: General Electric Company, Schenectady, N.Y.

[22] Filed: Apr. 18, 1973

[21] Appl. No.: 352,252

[52] U.S. Cl. ............................................. 313/489
[51] Int. Cl. ........................................... H01j 61/35
[58] Field of Search ............... 313/108 R, 109, 489

[56] References Cited
UNITED STATES PATENTS

| | | |
|---|---|---|
| 2,854,600 | 9/1958 | Van De Weijer et al. .......... 313/109 |
| 3,225,241 | 12/1965 | Spencer et al. ..................... 313/109 |
| 3,275,872 | 9/1966 | Chernin et al. ................. 313/108 R |
| 3,541,376 | 11/1970 | Sadoski et al. ..................... 313/489 |
| 3,599,029 | 8/1971 | Martyny .............................. 313/489 |
| 3,717,781 | 2/1973 | Sadoski et al. ..................... 313/489 |

Primary Examiner—Ronald L. Wibert
Assistant Examiner—Richard A. Rosenberger
Attorney, Agent, or Firm—Norman C. Fulmer; Lawrence R. Kempton; Frank L. Neuhauser

[57] ABSTRACT

An undercoat of magnesium oxide (MgO) is provided between the phosphor and a titanium dioxide ($TiO_2$) reflector in an aperture-type fluorescent reprographic lamp. Preferably, aluminum oxide ($Al_2O_3$), or aluminum oxide and antimony oxide ($Sb_2O_3$), are included with the MgO in the undercoat.

6 Claims, 1 Drawing Figure

UNDERCOAT FOR PHOSPHOR IN REPROGRAPHIC LAMPS HAVING TITANIUM DIOXIDE REFLECTORS

CROSS-REFERENCE TO RELATED APPLICATION

Ser. No. 188,096, filed Oct. 12, 1971, Edward E. Hammer and Edward E. Kaduk, "Fluorescent Lamp with Protective Coating", assigned the same as this invention, now abandoned.

BACKGROUND OF THE INVENTION

The invention is in the field of fluorescent lamps, particularly aperture-type fluorescent reprographic lamps used in copying documents and having a reflective coating of titanium dioxide ($TiO_2$) internally of the bulb and between the bulb and a phosphor layer, for reflecting light outwardly through the aperture in addition to the light emitted through the aperture directly from the phosphor layer.

In one type of aperture lamp, the aperture is in the form of an elongated region along at least a portion of the bulb and is free from both phosphor and reflector material, and in another type the aperture is free from reflector material but is covered with the phosphor. Various different materials have been proposed and used for the reflector coating and for the phosphor, and various other materials have been proposed and used for protective coatings on the phosphor and also on the inner surface of the glass bulb, particularly at the aperture, for reducing glass darkening which gradually occurs due to action of the mercury in the lamp.

The above-referenced related patent application describes an aperture-type fluorescent lamp having a clear protective coating of titanium dioxide ($TiO_2$) on the inner surface of the glass bulb, in turn covered by a reflective coating of particulate $TiO_2$ except at the aperture area. The reflective coating is covered at the inside thereof by a phosphor coating, and a postcoat of aluminum oxide ($Al_2O_3$) particles covers the inner surface of the phosphor and may also cover the aperture area, and functions to improve brightness maintenance and to reduce end discoloration in the bulb.

While certain prior designs of aperture-type fluorescent reprographic lamps have been generally satisfactory, there has been a tendency for non-uniform darkening to occur along the apertures and/or along the phosphor coatings as the lamps age with use, resulting in non-uniform lightness and darkness across the surface of copies made by machines using the lamps.

SUMMARY OF THE INVENTION

Objects of the invention are to provide an improved aperture-type fluorescent reprographic lamp, and to provide such a lamp having reduced non-uniform darkening along the aperture and/or phosphor as the lamp ages with use. The invention also increases the brightness of the lamp.

The invention comprises, briefly and in a preferred embodiment, an aperture-type fluorescent reprographic lamp having a titanium dioxide ($TiO_2$) reflector coating inside the bulb. Normally, a phosphor coating would be applied to the inside of the reflector coating. In accordance with the invention, an undercoat of magnesium oxide (MgO) is provided between the phosphor and the titanium dioxide reflector coating. Preferably, aluminum oxide ($Al_2O_3$), or aluminum oxide and antimony oxide ($Sb_2O_3$), are included with the MgO in the undercoat. The undercoat increases the brightness of the lamp, and also reduces the non-uniform darkening along the aperture as the lamp ages with use.

BRIEF DESCRIPTION OF THE DRAWING

The single FIGURE of the drawing is a broken-away perspective view of a preferred embodiment of the invention.

DESCRIPTION OF THE PREFERRED EMBODIMENTS

Figure 1:
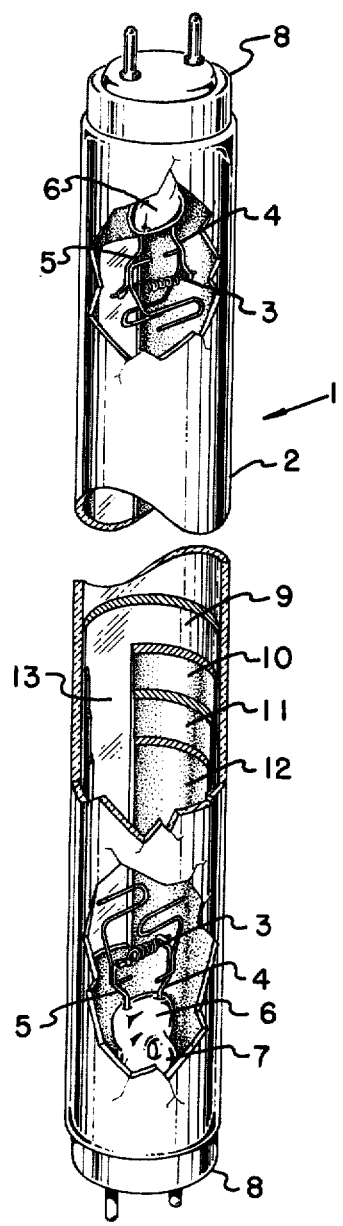

Referring to the drawing, there is shown a fluorescent lamp 1 comprising an elongated soda-lime silica glass bulb 2 of circular cross section. It has the usual electrode structure 3 at each end supported on inlead wires 4,5 which extend through a glass press 6 in a mount stem 7 to the contacts of a base 8 affixed to the end of the lamp. The sealed tube is filled with an inert gas such as argon or a mixture of argon and other gases at a low pressure, for example about 3 torr, and a small quantity of mercury, at least enough to provide a low vapor pressure of about 6 microns during lamp operation.

The inner surface of the glass bulb is protectively coated with a thin clear film 9 consisting of titanium dioxide. To form this clear layer, a metallo-organic compound of titanium such as tetrabutyl titanate or tetraisopropyl titanate dissolved in an appropriate solvent such as butyl alcohol or butyl acetate is applied to the glass. The solvent evaporates almost upon application, and the titanate is left deposited upon the inner surface of the glass tube. Moisture from the air hydrolizes the titanate almost as fast as the solvent evaporates forming titanium dioxide which remains as a very thin clear and transparent continuous film in a thickness from 0.002 to 0.02 microns.

The lamp is provided with a reflector coating 10 on the protective coating 9, an undercoat 11 on the reflector 10, and a phosphor coating 12 on the undercoat 11, the three coatings 10, 11 and 12 extending substantially the full length of the bulb and around the major portion of the bulb's circumferential surface. This leaves a narrow transparent strip or aperture 13 extending lengthwise of the lamp. The coatings 10, 11 and 12 may be applied in the named order over the entire glass tube internal surface (or over the protective film 9 if present) and then scraped or brushed off to form the aperture 13 of the desired width, for instance, over a 45° portion of the circumference of the bulb. The phosphor layer 12 may be covered, if desired, by a postcoat of particulate $Al_2O_3$ as described in the above-referenced patent application.

A preferred material for the reflective layer 10 is a coating of particulate titanium dioxide ($TiO_2$) having a particle size less than one micron diameter, for instance, centering on about 0.3 micron which is about half the median wavelength of the visible spectrum. The $TiO_2$ may be applied as a suspension in a solution of ethyl cellulose in an organic solvent to serve as a binder, the suspension being drawn up into the bulb supported vertically and then allowed to drain out. Thereafter, the bulb is lehred in order to decompose and drive out the organic binder.

The undercoat 11 of the invention comprises magnesium oxide (MgO), preferably combined with aluminum oxide ($Al_2O_3$) or aluminum oxide and antimony oxide ($Sb_2O_3$), and may be drawn up into the bulb and allowed to drain out.

In a preferred embodiment, the MgO is prepared as in step (a) below, and an ethyl cellulose binder is prepared as in step (b) below, then the undercoat is prepared in the form of a thick suspension as in (c) below, and then the thick suspension is diluted as in (d) below for use in lamps. The final composition is about 99.1 percent MgO, 0.5 percent $Al_2O_3$, and 0.4 percent $Sb_2O_3$, in fine particles about the same size as that of the $TiO_2$ reflector 10.

a. MgO Preparation 100 gm magnesium carbonate ($MgCO_3$).

Fired at 1100°C for 2.0 hrs. in 11 inch × 11 inch × 4 inch quartz trays, uncovered in air. Approximate yield-48 gm MgO.

b. Preparation of Ethyl Cellulose Binder (order of addition)

1. 86 cc Di-butyl-phthalate
2. 2120 cc Xylene
3. 32 cc Butanol
4. 58 gm Ethyl cellulose powder (N-200 Hercules)

Above ingredients rolled in a one gallon glass jug until N-200 powder is in solution, usually overnight.

c. Preparation of Thick Suspension (order of addition)

1 qt. Mill Charge (900 gm stones)

1. 135 cc Ethyl cellulose binder
2. 25 cc XB Thinner (95 percent xylene-5 percent butanol)
3. 1.3 cc Armeen CD fatty acid dispersant
4. 0.5 gm Aluminum oxide ($Al_2O_3$) (Cabot Alon)
5. 0.4 gm Antimony oxide powder ($Sb_2O_3$)
6. 100 gm Magnesium oxide (MgO) from (a) above Mill Time: 5.0 hrs. at 100 rpm.

Mill Rinse: 25 cc XB Thinner.

d. Dilution for Undercoat

Dilute with butyl acetate to give a thin suspension that coats:

1. 0.17 gm on a $TiO_2$ reflector 18 inch T8 bulb (wt. of $TiO_2$ reflector=1.1 gm), or
2. 0.50 gm on a $TiO_2$ reflector 22 inch T12 bulb (wt. of $TiO_2$ reflector=2.5 gm).

Regarding the fluorescent lamp bulbs referred to in (d) above, a T8 bulb is eight-eighths of an inch in external diameter, and a T12 bulb is 12/8 inch in external diameter.

The phosphor 12, which may consist of zinc orthosilicate $Zn_2SiO_4$, is next applied as a suspension in a solution of nitrocellulose in butyl acetate which is drawn up into the bulb and allowed to drain out. At this stage, the clear area or aperture 13 is scraped out in the desired width. The scraping removes the relatively thick powdery reflective layer 10 of $TiO_2$, the undercoat 11, and the phosphor layer 12, but the clear protective layer 9 of $TiO_2$ which resulted from the hydrolysis of tetrabutyl titanate is very adherent and is not affected. Examples of other phosphors that have been found suitable are MgAl gallate, or cool white halophosphate; many other phosphors can be used. The bulb is then lehred at a temperature of about 550° to 600°C for 3 to 5 minutes to decompose and drive out the binder of the phosphor 12 and its undercoat 11. Instead of applying the coatings over the entire periphery and then scraping, an alternative method is to introduce a pool of suspension of the desired coating in a horizontally supported tube which is then rocked back and forth to achieve the desired angular width of reflective coating, followed by drying and lehring, as taught in U.S. Pat. No. 2,892,440-Fulton et al.

The improved performance of a lamp made in accordance with the invention ($MgO-Al_2O_3-Sb_2O_3$ undercoat) compared to a similar lamp not having the undercoat is illustrated by the following Tables I and II, in which Table I is relative aperture brightness and Table II is brightness uniformity along the lamp expressed as brightness of the ends of the lamps as a percent of the center brightness, at various burning hours. These tests were made with six 22 inch T12 lamps having a cool white halophosphate phosphor and having the $TiO_2$ protective coating on the inside of the bulb and a particulate $TiO_2$ reflector coating, and the figures given are averaged for all the test lamps.

TABLE I

| | Aperture Brightness | | |
|---|---|---|---|
| | First End | Center | Second End |
| 0 hr. with Undercoat | 69.5 | 82.5 | 70 |
| 0 hr. Standard Lamp | 67.5 | 79 | 67.5 |
| 1 hr. with Undercoat | 67 | 80.5 | 69.2 |
| 1 hr. Standard Lamp | 65 | 76 | 64 |
| 84 hr. with Undercoat | 61 | 76 | 63 |
| 84 hr. Standard Lamp | 55.5 | 74.5 | 52 |

TABLE II

Percent Maintenance of End Brightness (E.B.) vs. Center Brightness (C.B.) at Different Operating Times

| Coating | Time Interval (Hrs.) | First End E.B. C.B. % | Center (100%) | Second End E.B. C.B. % |
|---|---|---|---|---|
| Undercoat Lamp | 0 | 84 | 100 | 85 |
| Standard Lamp | 0 | 85 | 100 | 85 |
| Undercoat Lamp | 1 | 83 | 100 | 86 |
| Standard Lamp | 1 | 86 | 100 | 84 |
| Undercoat Lamp | 84 | 80 | 100 | 83 |
| Standard Lamp | 84 | 74 | 100 | 70 |

In the tables above, the "first end" of the lamp has a shorter mount, i.e., shorter inlead wires 4,5 than at the "second end". The reason for the different mount lengths is so that one end will operate cooler for achieving mercury pressure control. The tables illustrate the improved brightness, brightness maintenance, and brightness uniformity along the aperture of lamps made in accordance with the invention.

While it is not fully understood how the invention functions to improve lamp performance, it is believed that the undercoat may have a gettering action on the gas fill in the lamp, and also improves reflectivity by reflecting some of the light which otherwise would escape through the $TiO_2$ reflector coating (which is not a perfect reflector), and also tends to reduce mercury deposition in the phosphor and on the $TiO_2$ reflector coating.

While preferred embodiments of the invention have been shown and described, various other embodiments and modifications thereof will become apparent to persons skilled in the art, and will fall within the scope of the invention as defined in the following claims.

What we claim as new and desire to secure by Letters Patent of the United States is:

1. An aperture-type fluorescent reprographic lamp comprising an elongated envelope containing an ionizable medium including mercury vapor and having electrodes at the respective ends thereof, a $TiO_2$ reflector coating within said envelope and a phosphor coating within said reflector coating, wherein the improvement comprises an undercoat of MgO combined with $Al_2O_3$ between and in contact with said phosphor coating and said reflector coating.

2. A lamp as claimed in claim 1 in which said undercoat further includes $Sb_2O_3$.

3. A lamp as claimed in claim 2 in which said undercoat comprises about 99.1 percent MgO, 0.5 percent $Al_2O_3$, and 0.4 percent $Sb_2O_3$.

4. A lamp as claimed in claim 2 in which said reflector coating and said undercoat materials are in the form of small particles about the same size.

5. A lamp as claimed in claim 4 in which said particles are less than one micron in diameter.

6. A lamp as claimed in claim 5 in which said particles average about 0.3 micron in diameter.

* * * * *